United States Patent [19]

Roovers et al.

[11] Patent Number: 5,700,225
[45] Date of Patent: Dec. 23, 1997

[54] METHOD AND APPARATUS FOR CONTROLLING THE TRANSMISSION RATIO OF A CONTINUOUSLY VARIABLE TRANSMISSION

[75] Inventors: Wilhelmus Cornelus Waltherus Maria Roovers, Prinsenbeek; Chi Chung Choi, Eindhoven, both of Netherlands

[73] Assignee: Van Doorne's Transmissie B.V., Tilburg, Netherlands

[21] Appl. No.: 515,531

[22] Filed: Aug. 15, 1995

[30] Foreign Application Priority Data

Oct. 21, 1994 [NL] Netherlands .................. 9401747

[51] Int. Cl.$^6$ .................................................. B60K 41/12
[52] U.S. Cl. .................................................. 477/46; 477/48
[58] Field of Search .................................... 477/46, 47, 48, 477/49

[56] References Cited

FOREIGN PATENT DOCUMENTS

| | | |
|---|---|---|
| 0 011 342 | 5/1980 | European Pat. Off. . |
| 0 217 221 | 4/1987 | European Pat. Off. . |
| 0 280 757 | 9/1988 | European Pat. Off. . |
| 0 602 672 | 6/1994 | European Pat. Off. . |
| 43 12 415 | 10/1994 | Germany . |

*Primary Examiner*—Charles A. Marmor
*Assistant Examiner*—Saúl J. Rodríguez
*Attorney, Agent, or Firm*—Young & Thompson

[57] ABSTRACT

A method for controlling the transmission ratio (input speed/output speed) of a continuously variable transmission, in particular for a motor vehicle. The transmission can be set to a second operational state as a result of energization by an activation signal. In the second operational state, the transmission ratio increases or decreases in the event of a decrease of increase, respectively, in the output speed of the transmission. In the second operational state, the transmission ratio is controlled using a control line, which intersects a point determined by the instantaneous input speed and instantaneous output speed of the transmission at the instant of commencement of said second operational state and also intersects a starting point determined by an input speed equal to zero and an output speed notionally less than zero. The invention also relates to an apparatus for carrying out the method.

11 Claims, 3 Drawing Sheets

METHOD AND APPARATUS FOR CONTROLLING THE TRANSMISSION RATIO OF A CONTINUOUSLY VARIABLE TRANSMISSION

FIELD OF THE INVENTION

The invention relates to a method for controlling the transmission ratio (input speed/output speed) of a continuously variable transmission, in particular for a motor vehicle, in which the transmission can be set to a second operational state as a result of energization by an activation signal, in which operational state the transmission ratio increases or decreases in the event of a decrease or increase, respectively, in the output speed of the transmission.

BACKGROUND OF THE INVENTION

Such a method is disclosed in European Patent Specification 0 011 342. The activation of the operational state in which, according to this known method, the transmission ratio increases or decreases in the event of a decrease or increase, respectively, in the output speed results in a so-called engine-braking effect, which is very desirable under some conditions, for example in negotiating bends or slopes, or in an increased acceleration, respectively. This known method operates well per se, but requires a relatively complicated and consequently relatively slow control apparatus with little flexibility.

SUMMARY OF THE INVENTION

The object of the invention is to provide an improved method which is, in particular, fast and flexible and requires a relatively simple control apparatus.

For this purpose, the method according to the invention is characterized in that, in said second operational state the transmission ratio is controlled by means of a control line which, on the one hand, intersects a point determined by the instantaneous input speed and the instantaneous output speed of the transmission at the instant of commencement of said second operational state and, on the other hand, intersects a starting point determined by an input speed equal to zero and an output speed notionally less than zero. According to this method, when said operational state commences, the control line is first determined, after which the transmission ratio is controlled by means of the control line. At the same time, only one input variable, namely the output speed (vehicle velocity), is necessary, from which the transmission ratio to be adjusted follows directly by means of the control line.

The method and the control apparatus needed therefor are consequently simple and fast.

According to the invention, the control line may be a curve, so that, for different magnitudes of the output speed, engine-braking effect or increased acceleration is also obtained to a varying extent.

On the other hand, the invention can also make do with a straight control line, as a result of which the control can, in particular, be simple and the occupants of the vehicle notice a uniform engine-braking effect or increase in acceleration, respectively, which is experienced as pleasant.

The control line and/or the starting point can, according to the invention, be variable and be determined as a function of the nature and magnitude of the activation signal. Thus, the degree of engine-braking effect or increased acceleration can be optimized as a function of the circumstances. The nature and magnitude of the activation signal may at the same time be determined, inter alia, by and as a function of the magnitude of one or more of the following variables or derivatives thereof: the accelerator position, the accelerator speed, the vehicle velocity, the input speed or output speed of the transmission, the engine speed, the braking force, the position of the brake pedal, transverse and/or longitudinal accelerations, angles of slope of the vehicle, an instruction given by the driver, steering position and/or wheel position of the vehicle. These variables can be utilized either to activate or to discontinue the second operational state.

According to the invention, the activation signal can be overridden if the input speed of the transmission reaches an adjustable minimum and/or maximum speed. This prevents the engine stalling or overrunning as a result of the method according to the invention, which could result in unsafe situations.

The invention furthermore relates to a continuously variable transmission for carrying out the method according to the invention, in particular for a motor vehicle, provided with control means for setting the transmission ratio to a first operational state, which transmission is characterized, according to the invention, in that the control means can be set to a second operational state in which the transmission ratio is controlled by means of a control line which, on the one hand, intersects a point determined by the instantaneous input speed and the instantaneous output speed of the transmission at the instant of commencement of said second operational state and, on the other hand, intersects a starting point determined by an input speed equal to zero with an output speed notionally less than zero. For this purpose, the control means may be provided with inputs for input signals, which signals correspond to parameters which are utilized to define the operational conditions under which the control means are operated in the second operational state.

The control means may comprise an electronic control system.

According to the invention, the control means may furthermore comprise first memory means in which parameters are stored which are utilized to define the operational conditions under which the control means are operated in the second operational state, which parameters are compared with the input signals, and the first memory means may comprise outputs for one or more activation signals which are energized in the case of a defined operational state.

In addition, there is the possibility that the control means comprise second memory means having one or more inputs for the activation signals of the first memory means, the second memory means containing parameters for determining a starting point and a control line as a function of the instantaneous input speed and the instantaneous output speed of the transmission at the instant of the commencement of the second operational state, in such a way that the desired control line is obtained at the output of the second memory for further adjustment by the control means. In particular, according to the invention, control lines and/or starting points can be stored in the second memory as a function of the nature and magnitude of the activation signals originating from the first memory. The control means may also comprise a control circuit which controls the desired transmission ratio on the basis of the generated control line and the instantaneous output speed of the transmission.

BRIEF DESCRIPTION OF THE DRAWINGS

The invention will be explained by reference to a drawing. In the drawing.

DESCRIPTION OF THE PREFERRED EMBODIMENTS

Figure 1:
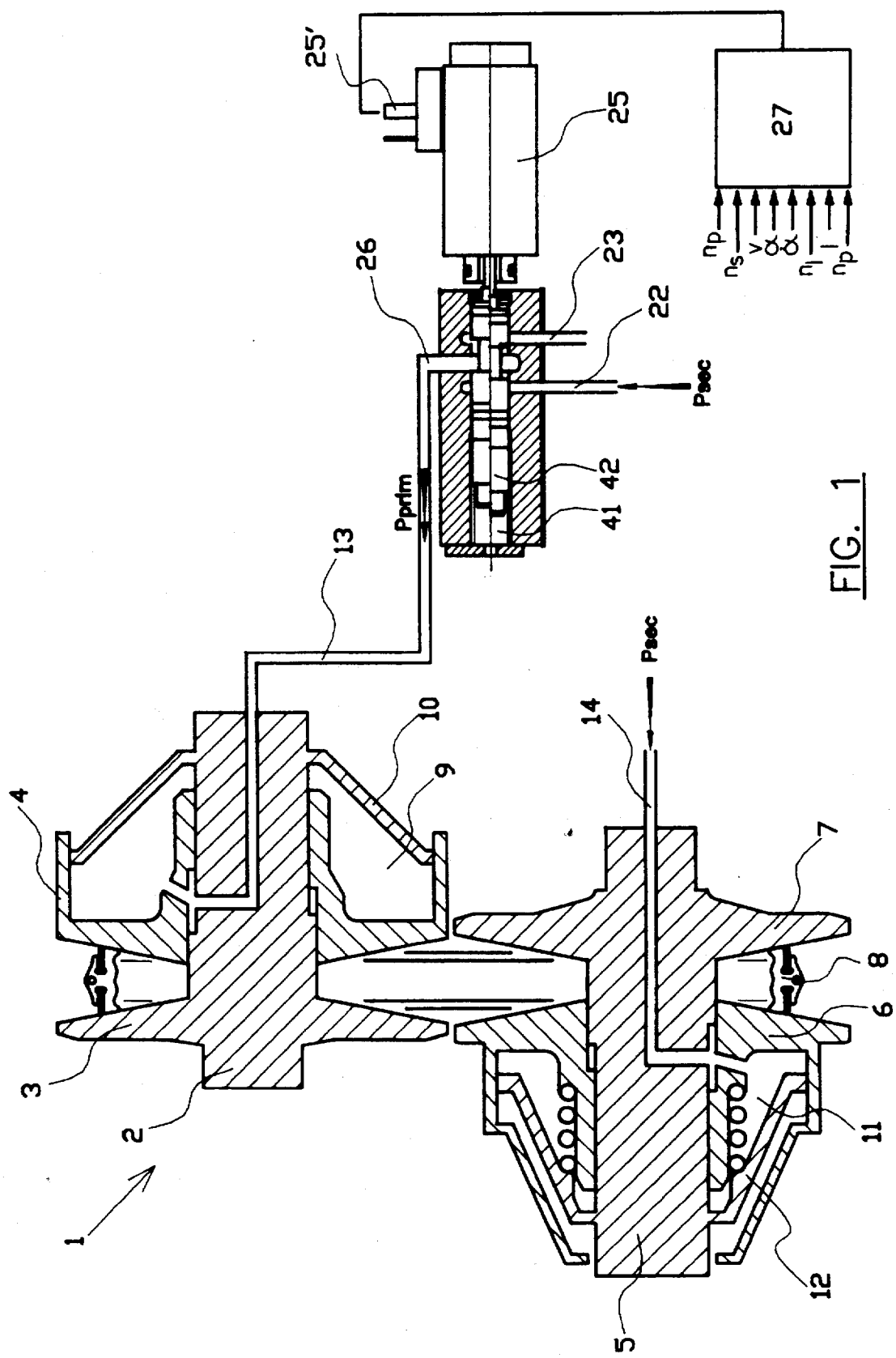
FIG. 1 shows a diagrammatically reproduced continuously variable transmission of the drive-belt/pulley type, provided with control means.

The continuously variable transmission shown diagrammatically in FIG. 1 comprises two pulleys having, on the one hand, a fixed disc 3 and an axially displaceable disc 4 mounted on primary pulley shaft 2 and, on the other hand, a fixed disc 7 and an axially slidable disc 6 on secondary pulley shaft 5. The discs 4 and 6, respectively, are axially displaceable by means of the piston/cylinder assemblies 10 and 12, respectively. Between the primary discs 3, 4, on the one hand, and the secondary discs 6, 7, on the other hand, there is a drive belt 8. In this arrangement, the transmission ratio of the transmission is determined by the ratio of the radial position of the belt between the primary pulley 3, 4 and the radial position between the secondary pulley 6, 7. Under these circumstances, the transmission ratio corresponds to the quotient of the speed of the primary pulley shaft 2 (the input speed) and the speed of the secondary pulley shaft 5 (the output speed of the transmission). The transmission ratio can be controlled by conveying fluid from and to the cylinder chambers 9 and 11, respectively, through the pipes 13 and 14, respectively. Generally, but not necessarily, the pressure $P_{sec}$ in the cylinder chamber 11 is utilized to obtain adequate pressure force for the drive belt 8 and the pressure $P_{prim}$ in the chamber 9 is utilized to control the transmission ratio of the transmission. For this purpose, the chamber 9 is connected by means of the pipes 13 and 26 to a primary control valve 41 which adjusts the $P_{sec}$ in pipe 22 to a desired primary pressure $P_{prim}$ by means of the gate 42 and, for this purpose, can convey fluid to chamber 9 or, in particular, vent it via pipe 23. Under these circumstances, the gate 42 is positioned by an electronic control device 25 which is connected by means of a connection 25' to an electronic control unit 27 which determines the transmission ratio to be set on the basis of one or more input variables, such as the input speed $n_p$, the output speed $n_s$, the vehicle velocity v, the accelerator position $\alpha$, the accelerator speed $\alpha'$ and/or other possible variables, $n_1$-$n_p$. In other respects, the operation of the continuously variable transmission is assumed to be known.

Figure 2:
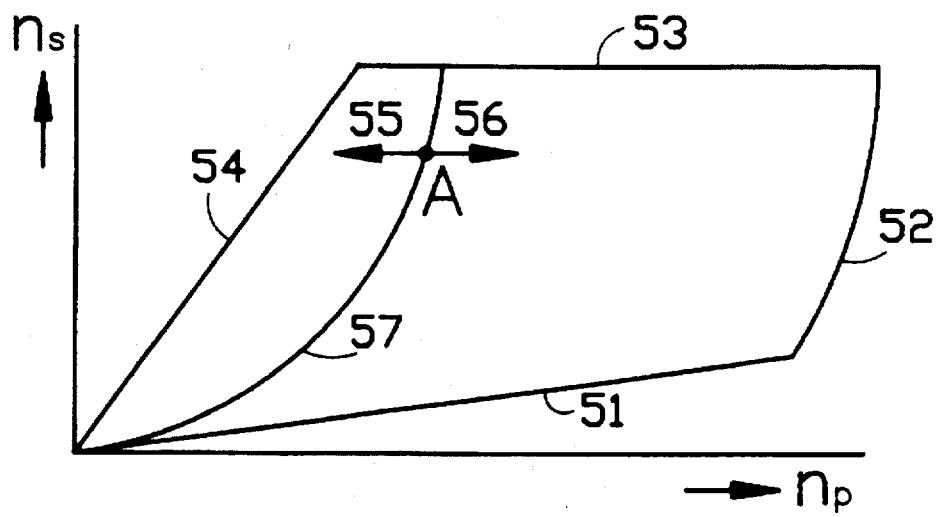
FIG. 2 shows a variogram of the transmission according to FIG. 1, with control lines according to the prior art.

FIG. 2 shows a so-called variogram, in which an enclosed field of possible combinations of input and output speeds of the transmission is described by the lines 51, 52, 53 and 54. If, starting from an operational point A, braking now takes place, or a slope is negotiated or acceleration takes place, respectively, the transmission tends to start to vary along the arrow 55 or arrow 56, respectively. In some cases, such as in negotiating slopes or negotiating bends, however, an engine-braking effect may be desired, whereas, on the other hand, more acceleration may be desired, for example, during an overtaking maneuver of the vehicle. For this reason, European Patent Specification 0 011 342 proposes, under operational conditions to be defined more precisely, to increase or to decrease the transmission ratio in the case of a decreasing or increasing, respectively, output speed of the transmission. This takes place, for example, starting from point A along a line 57. In this known method, the control means have to determine every point on the control line 57, and therefore the desired transmission ratio, on the basis of all the input variables. For this purpose, relatively complicated and, consequently, relatively slow control means with little flexibility are required.

Figure 3:
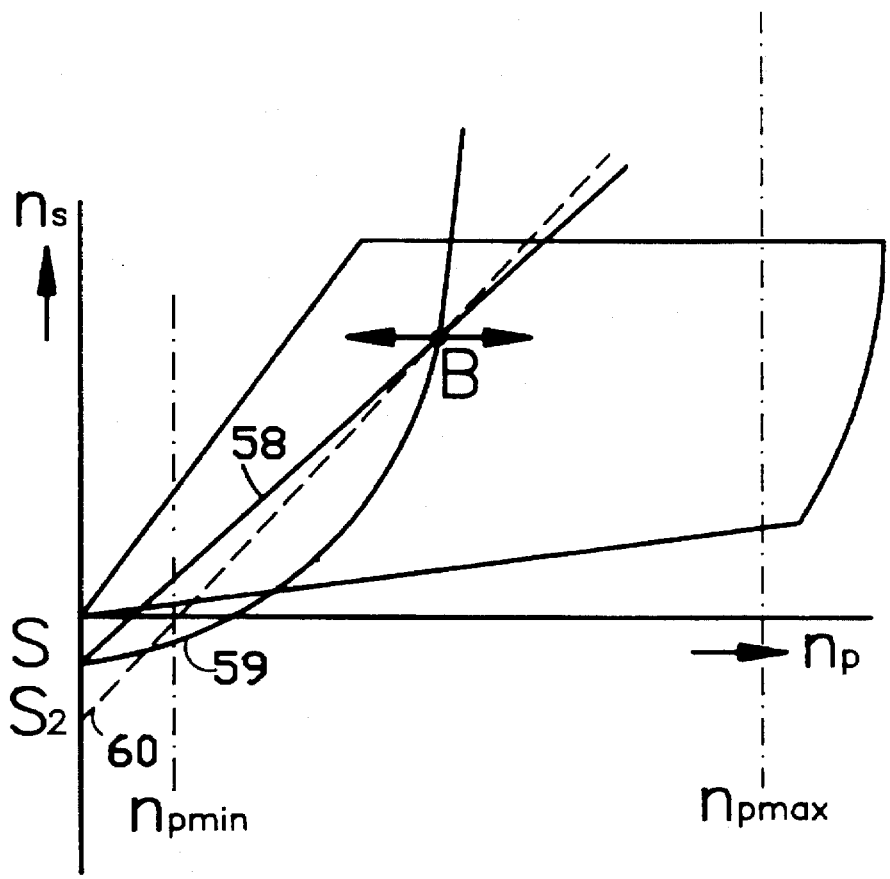
FIG. 3 shows a variogram of the transmission according to FIG. 1, with control lines according to the invention.

FIG. 3 shows the method according to the invention. If, for example, starting from the operational point B, there is need for engine-braking effect or additional acceleration under operational conditions to be defined more precisely, such as negotiating slopes or bends, or during an overtaking maneuver, the control means enter a second operational state. In said second operational state, a starting point S and a control line through the starting point S and point B are determined. Point B is determined by the instantaneous input speed and output speed of the transmission, while point S is a suitable point for an input speed equal to zero with an output speed notionally less than zero. The control line through the points S and B may be a straight line 58, but it may also be a suitable curved line 59. In the case of a curved line, the engine-braking effect or the degree of acceleration varies, and this may be desirable in some cases. The point S may be a fixed point, but it may also be varied as a function of the circumstances. The control line 58, 59 and the starting point S may be made a function, for example, of the nature and/or magnitude of the activation signal. Thus, for negotiating bends and for negotiating slopes, a different degree of engine-braking effect may be desired, resulting in different activation signals and different starting points S and control lines. Thus, for example, with accelerator not being depressed (accelerator position $\alpha=0$) and during braking, it is found that a bend is negotiated for which, for example, control line 58 may be suitable, whereas, for negotiating slopes it may be found as a result, for example, of the angle of slope of the vehicle and the accelerator not being depressed that, for example, the control line 59 may be very suitable. Furthermore, for example, during very severe braking when negotiating bends, the starting point $S_2$ with control line 60 may be a better choice. To define the various operational conditions for which the second operational state should be operated, a large number of input variables or derivatives thereof (also with respect to time) may be employed, which are not limited to the following: the accelerator position, the accelerator speed, the vehicle velocity, the input speed or output speed of the transmission, the engine speed, the braking force, the position of the brake pedal, transverse and/or longitudinal accelerations, angles of slope of the vehicle, an instruction given by the driver, steering position and/or wheel position of the vehicle. Thus, for example, the transmission can be set to the second operational step by the accelerator not being depressed, whereas the second operational state can be discontinued, for example, by braking heavily or by accelerating again beyond a certain degree.

On the basis of FIG. 3, it will be clear that the method according to the invention provides a relatively simple, fast and flexible control device. After all, if the second operational state has commenced and the control line has been determined, the control system has still to determine the desired transmission ratio on the control line only on the basis of the instantaneous output speed $n_s$ and to adjust it, with the input speed $n_p$ as the sole variable. Precisely because only the output speed $n_s$ on its own is used as input variable, no complex and slow computation exercises are necessary and the control system can be very flexibly adapted to the specific operational conditions.

For considerations of service life and safety, the second operational state can still be overridden, for example, if the input speed of the transmission reaches an adjustable minimum ($n_{pmin}$) and/or maximum ($n_{pmax}$), so that the engine cannot stall or run away.

Figure 4:
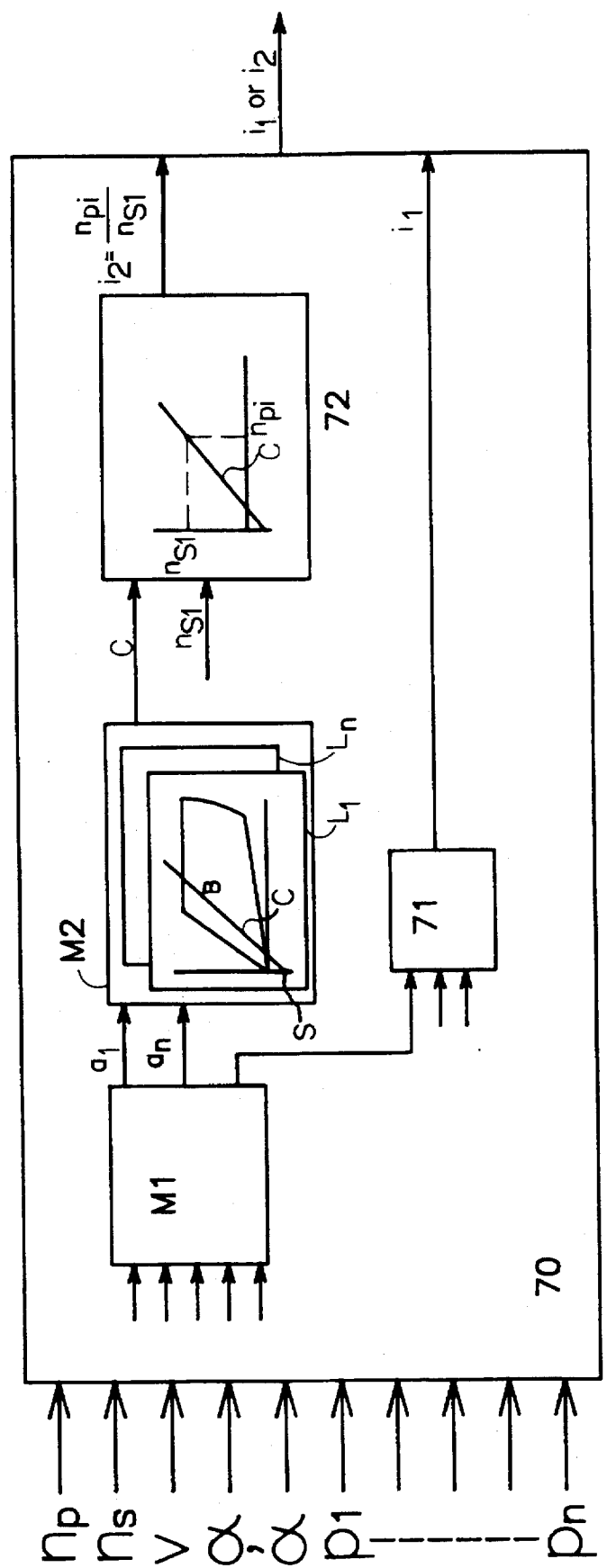
FIG. 4 shows a diagrammatic embodiment of control means according to the invention.

It will be clear that the method according to the invention can be carried out by various suitable control means. A particularly suitable one is shown in FIG. 4. In addition to the input variables which are used in a first and second operational state to control the transmission ratio, those variables and derivatives thereof are fed to the control means which are used to define the operational conditions for which the control means are operated in a second operational state; these are shown here by, but not limited to, the following variables: $n_p$, $n_s$, $\alpha$, $\alpha'$, $p_1 \ldots p_n$. The variables which correspond to the parameters which define the operational conditions for which the control means are operated in a second operational state are added to a first memory M1. Stored in the memory M1 are the parameters which are compared with the input variables. If the input variables do not conform to, or no longer conform to, one or more of the parameters stored in the memory M1 for the second operational state, the control means 70 are operated according to the first operational state by means of a control system 71, which control system 71 emits a signal corresponding to the desired transmission ratio $i_1$ to control the transmission ratio.

If the input variables do conform to one or more parameters for the second operational state in the first memory M1, the control system 71 according to the first operational state is discontinued and the second operational state is activated. For this purpose, the memory M1 emits one or more activation signals $a_1 \ldots a_n$ to the second memory M2. Stored in the second memory M2 are one or more cards $L_1=L_n$ from which, on the basis of the activation signals $a_1=a_n$, the desired starting point S and the control line C are chosen which are associated with the instantaneous input speed and output speed of the transmission at the commencement of the second operational state (point B). On the basis of the control line C and the measured instantaneous output speed $n_{s1}$ of the transmission, a signal is then emitted by control system 72 which corresponds to the desired transmission ratio $i_2$, or the desired input speed $n_p$. As long as the specific operational state continues to be maintained, the specific control line C is also maintained, so that the control system 72 is able to control very rapidly on the basis of the instantaneous output speed $n_{s1}$ alone.

We claim:

1. A method for controlling a transmission ratio (input speed/output speed) of a continuously variable transmission in a vehicle, said method setting said transmission ratio from a first operational state to a second operational state as a result of energization by an activation signal, said second operational state causing said transmission ratio to increase when an output speed of said transmission decreases and to decrease when said output speed of said transmission increases, comprising the steps of:

controlling said transmission ratio in said second operational state using a control line, which intersects a point determined by an instantaneous input speed and an instantaneous output speed of said transmission at an instant of commencement of said second operational state and intersects a starting point determined by an input speed equal to zero and said output speed notionally less than zero, at least one of said control line and said starting point being variable and being determined as a function of at least one of a nature and a magnitude of said activation signal.

2. A method according to claim 1, wherein said control line is a curve.

3. A method according to claim 1, wherein said control line is a straight line.

4. A method according to claim 1, wherein said nature and said magnitude of said activation signal are determined by a function of the magnitude of at least one of the following variables and derivatives thereof: an accelerator position, an accelerator speed, a vehicle velocity, one of said input speed or said output speed of said transmission, an engine speed, a braking force, a position of the brake pedal, transverse and longitudinal accelerations, angles of slope of said vehicle, an instruction given by a driver, at least one of a steering position and a wheel position of said vehicle.

5. A method according to claim 1, wherein said activation signal is discontinued if said input speed of said transmission reaches one of an adjustable minimum speed and an adjustable maximum speed.

6. A continuously variable transmission, for a motor vehicle, comprising control means for setting a transmission ratio of said transmission to a first operational state, said control means having means for setting said transmission to a second operational state in which the transmission ratio is controlled by means of a control line, which intersects a point determined by an instantaneous input speed and an instantaneous output speed of said transmission at an instant of commencement of said second operational state and intersects a starting point determined by an input speed equal to zero and an output speed notionally less than zero, said control means having input signals corresponding to parameters defining operational conditions of said control means in said second operational state.

7. A continuously variable transmission according to claim 6, wherein said control means comprise an electronic control system.

8. A continuously variable transmission according to claim 7, wherein said control means comprise first memory means for storing parameters defining operational conditions of said control means in said second operational state, said parameters being compared to said input signals, and said first memory means comprises outputs for at least one activation signal which is energized for a defined operational state.

9. A continuously variable transmission according to claim 8, wherein said control means comprise a second memory means having at least one input for said at least one activation signal of said first memory means, said second memory means containing parameters for determining a starting point and a control line as a function of said instantaneous input speed and said instantaneous output speed of said transmission at the instant of commencement of said second operational state, in such a way that a desired control line is generated at an output of said second memory means for further adjustment by said control means.

10. A continuously variable transmission according to claim 9, wherein one of said control line and said starting point is stored in said second memory means as a function of at least one of said nature and said magnitude of said at least one activation signal originating from said first memory means.

11. A continuously variable transmission according to claim 9, wherein said control means comprise a circuit in which a desired transmission ratio can be controlled on the basis of said generated control line and said instantaneous output speed.

\* \* \* \* \*